H. L. CRISP & B. T. HARRISON.
FISH SCREEN.
APPLICATION FILED SEPT. 10, 1915.
1,269,058.
Patented June 11, 1918.
2 SHEETS—SHEET 2.
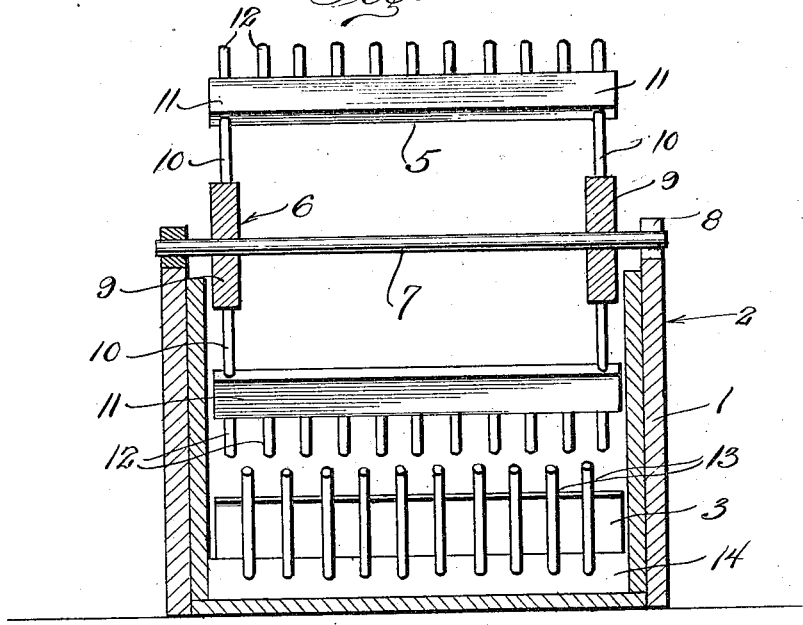
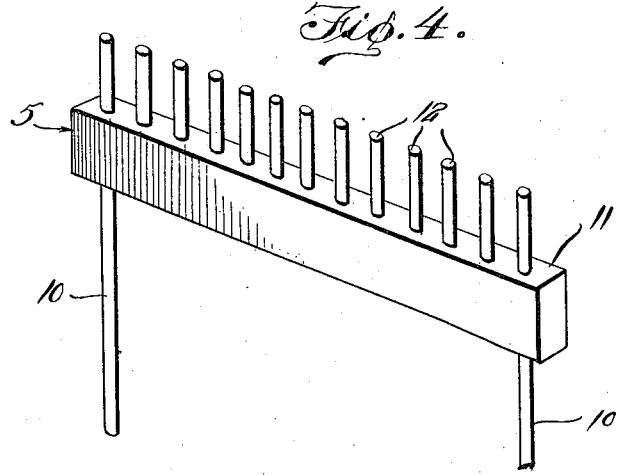
WITNESSES
INVENTOR
Henry L. Crisp
Ben T. Harrison.
BY
ATTORNEY

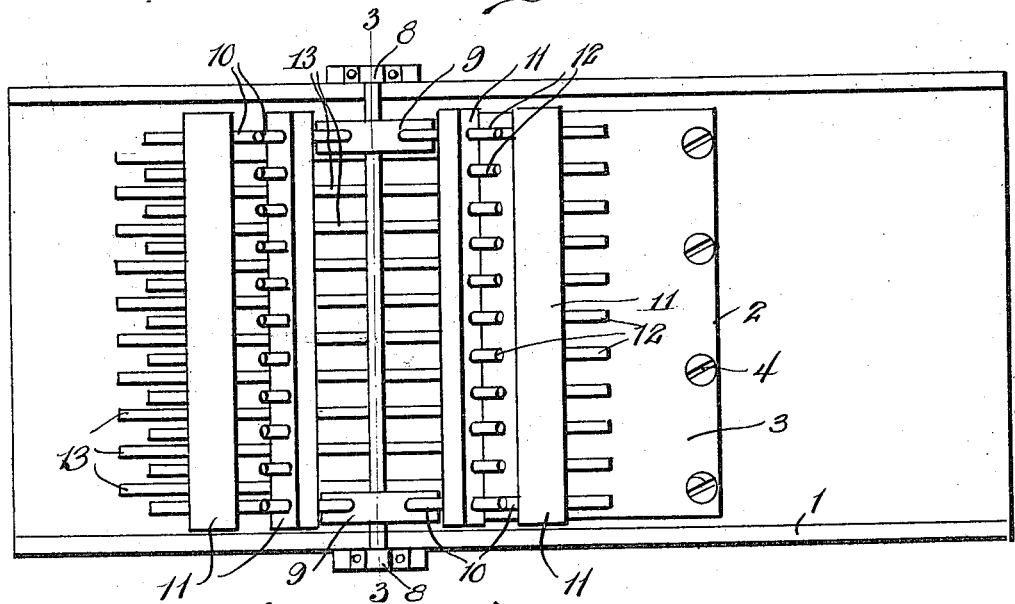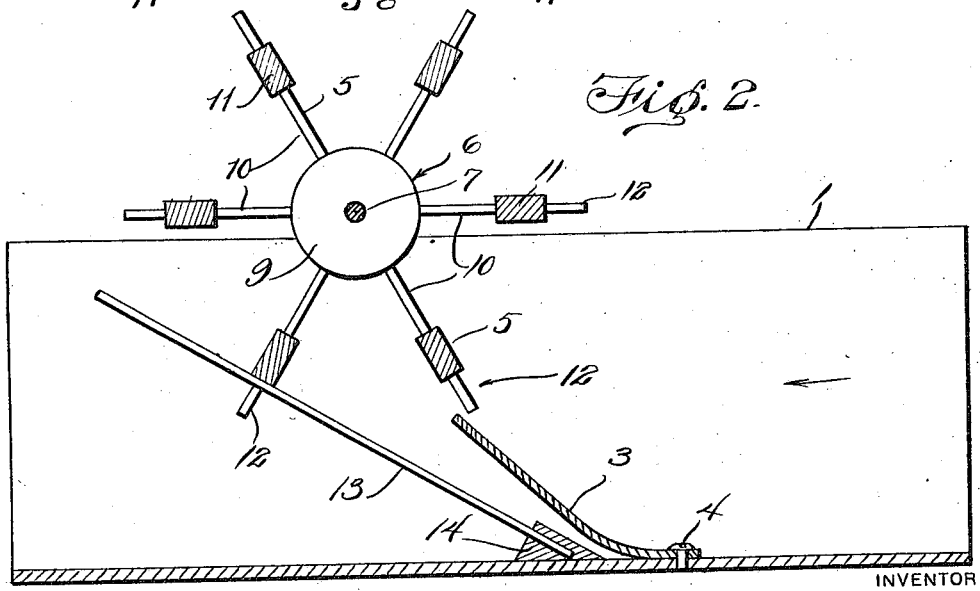

UNITED STATES PATENT OFFICE.

HENRY L. CRISP AND BEN T. HARRISON, OF JAYTON, TEXAS.

FISH-SCREEN.

1,269,058.  Specification of Letters Patent.  Patented June 11, 1918.

Application filed September 10, 1915.  Serial No. 50,017.

*To all whom it may concern:*

Be it known that we, HENRY L. CRISP and BEN T. HARRISON, citizens of the United States, residing at Jayton, in the county of Kent and State of Texas, have invented certain new and useful Improvements in Fish-Screens, of which the following is a specification.

Our invention relates to fish screens for irrigating ditches and contemplates an improved construction whereby a complete barrier for fish is in evidence without impeding in any way down-stream movement of floating debris.

The invention may be said to consist in the novel construction, and arrangement of parts hereinafter described and more particularly pointed out in the claim.

In the drawings, annexed:

Figure 1 is a top plan view of our improved fish screen;

Fig. 2 is a longitudinal sectional view;

Fig. 3 is a cross section on the line 3—3 of Fig. 1; and

Fig. 4 is a detail perspective view of one of the blades in the water wheel.

Before proceeding with a description of the drawings, we desire to call particular attention to the fact that while we have evolved our invention with reference to its use as a fish barrier for irrigating ditches, the same, if desired, may be used in connection with flumes, waterways, and in fact any and all channels of a size permitting use.

Referring now to the drawings by numerals, 1 designates an irrigating ditch, flume or other waterway across which the fish barrier or screen designated as an entirety by the numeral 2 extends. The said screen or barrier in its preferred embodiment may be said to consist of a spring plate 3 secured as at 4 to the bottom of the ditch or flume whereby to extend upwardly therefrom at an angle, the top edge of the said plate being engaged by the vanes or blades designated 5 of a water wheel 6 disposed in a horizontal plane above that of the plate 3 and like the said plate 3, to extend transversely of the ditch.

The said water wheel 6 is mounted on a shaft 7 journaled in bearings 8 secured to the sides of the ditch or flume. Disks 9 are mounted on said shaft 7 adjacent the terminals thereof, from which disks the blades 5 radiate in uniform spaced relation. Each blade 5 consists of end radial arms 10, a relatively flat connecting blade 11 and a plurality of uniformly spaced teeth 12, the latter, said teeth 12 being embedded in the blade 11 to extend radially relatively to the axis of the water wheel.

A plurality of uniformly spaced angle bars 13 are embedded in a block 14 disposed to extend transversely of the ditch or flume, the mentioned block being located in proximity to the plate 3 somewhat at the rear thereof. The said bars 13, as shown to advantage in Fig. 2, extend in the same general direction as the plate 3 to be intersected by the teeth 12 of the water wheel while rotating.

Operation of the fish barrier or screen is as follows: Assuming that the water in the ditch or flume 1 is flowing in the direction indicated by the arrow in Fig. 2 it is apparent that the water wheel 6 will be set in motion and the teeth 12 forming a part of the blades 5 brought into contact with the top edge of the angle plate 3. The said angle plate 3 being constructed of an inherently resilient material it is further evident that turning movement of the water wheel 6 will in no way be checked to an appreciable degree, the noise incident to movement of the blade 5 beyond the plate 3 acting as a scare to approaching fish. The said plate 3 will also act as a barrier and deflector for submerged debris that the said debris may be directed upwardly and against the blade 5 of the water wheel that it may move therewith beyond the barrier 13 formed by the parallel rods or bars. By constructing the blade 11 of the water wheel as before pointed out, sufficient contacting surface is in evidence to impart to said blade the desired rotary movement. The teeth, extending radially of the blade 11 will, as suggested, intersect or operate between the rods or bars 13 to in this manner completely and positively produce the desired barrier whereby movement of fish, down-stream beyond said wheel cannot under any circumstances take place.

In reduction to practice, we have found that the form of our invention, illustrated in the drawings and referred to in the above description, as the preferred embodiment, is the most efficient and practical; yet realizing that the conditions concurrent with the adoption of our device will necessarily vary, we desire to emphasize the fact that various minor changes in details of construction, proportion and arrangement of parts may be resorted to, when required, without sacrificing any of the advantages of our invention, as defined in the appended claim.

Having thus fully described our invention, what we claim as new and desire to secure by Letters Patent, is:—

In a fish screen for water-ways, a water wheel including a plurality of blades, a plurality of radial teeth on each blade, a sounding element in the form of a resilient plate adapted to be secured at one longitudinal edge to the bed of the stream and to extend upward and at an angle and in the direction of the flow of the stream, whereby the upper edge thereof may be engaged during rotation of the wheel, by the teeth to produce a noise, and means engageable by the teeth during revolution of the wheel to remove the debris from the teeth.

In testimony whereof we affix our signatures in presence of two witnesses.

HENRY L. CRISP.
BEN T. HARRISON.

Witnesses:
F. M. ALLEN,
M. I. HARRISON.

Copies of this patent may be obtained for five cents each, by addressing the "Commissioner of Patents, Washington, D. C."